(12) United States Patent
Vesley et al.

(10) Patent No.: US 6,960,275 B2
(45) Date of Patent: Nov. 1, 2005

(54) METHOD OF MAKING A VISCOELASTIC ARTICLE BY COATING AND CURING ON A REUSABLE SURFACE

(75) Inventors: George F. Vesley, Hudson, WI (US); Gary W. Maier, Roberts, WI (US); Peter M. Seiler, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 320 days.

(21) Appl. No.: 10/121,489

(22) Filed: Apr. 12, 2002

(65) Prior Publication Data

US 2003/0194526 A1 Oct. 16, 2003

(51) Int. Cl.[7] .............................. B65C 5/00; C09J 7/00; B29C 39/14; B29C 43/22
(52) U.S. Cl. ...................... 156/230; 156/217; 156/235; 156/241; 428/515; 427/146
(58) Field of Search ................................. 156/210, 230, 156/232, 235, 241, 247, 243, 272.2, 289, 219, 275.7, 273.3, 273.5; 427/146, 147, 148; 428/142, 156, 172, 195.1, 202, 515, 516, 517, 562, 915, 916, 522; 53/428, 440; 206/447; 264/165, 166

(56) References Cited

U.S. PATENT DOCUMENTS

| | | | |
|---|---|---|---|
| 3,689,346 A | * | 9/1972 | Rowland ..................... 156/245 |
| 4,751,108 A | | 6/1988 | Larimore et al. |
| 5,152,917 A | | 10/1992 | Pieper et al. |
| 5,273,805 A | | 12/1993 | Calhoun et al. |
| 5,344,681 A | | 9/1994 | Calhoun et al. |
| 5,435,816 A | | 7/1995 | Spurgeon et al. |
| 5,449,540 A | | 9/1995 | Calhoun et al. |
| 5,462,765 A | | 10/1995 | Calhoun et al. |
| 5,558,740 A | * | 9/1996 | Bernard et al. ............. 156/231 |
| 5,650,215 A | * | 7/1997 | Mazurek et al. ............ 428/156 |
| 5,667,303 A | | 9/1997 | Arens et al. |
| 5,700,302 A | | 12/1997 | Stoetzel et al. |
| 5,733,570 A | | 3/1998 | Chen et al. |
| 5,763,049 A | * | 6/1998 | Frey et al. ................... 156/212 |
| 5,785,784 A | * | 7/1998 | Chesley et al. ............. 156/232 |
| 5,804,610 A | * | 9/1998 | Hamer et al. ............... 522/182 |
| 5,897,930 A | | 4/1999 | Calhoun et al. |
| 5,948,199 A | * | 9/1999 | McGrew ..................... 156/231 |
| 6,103,316 A | | 8/2000 | Tran et al. |
| 6,566,575 B1 | * | 5/2003 | Stickels et al. ............... 602/41 |

FOREIGN PATENT DOCUMENTS

| | | | |
|---|---|---|---|
| WO | WO 97/33945 | 9/1997 | ............. C09J/4/00 |
| WO | WO 00/04055 | 1/2000 | |
| WO | WO 01/60296 A1 | 8/2001 | |

* cited by examiner

Primary Examiner—Sue A. Purvis
(74) Attorney, Agent, or Firm—Nancy M. Lambert

(57) ABSTRACT

The present invention provides methods of manufacturing a viscoelastic article by a process that includes coating a release surface with a curable composition and then curing the composition to form the viscoelastic article. Viscoelastic articles manufactured according to the methods of the present may be constructed to be self-supporting.

40 Claims, 1 Drawing Sheet

METHOD OF MAKING A VISCOELASTIC ARTICLE BY COATING AND CURING ON A REUSABLE SURFACE

BACKGROUND OF THE INVENTION

Viscoelastic materials may be designed to possess a wide variety of chemical and physical properties. As a result, viscoelastic materials may be useful for constructing a wide variety of articles for a wide variety of uses. The versatility of viscoelastic articles presents certain manufacturing challenges for the construction of such articles, particularly in a commercial setting where cost effective, large-scale manufacturing is particularly desirable. Speed and consistency of manufacture and reduction of waste are all issues of specific concern for any commercial manufacturing process.

Articles including viscoelastic materials, e.g., pressure sensitive adhesive (PSA) materials, may be manufactured using a variety of processes. For example, transfer tapes including segmented PSAs may be constructed using a carrier web embossed to contain recesses in a surface of the web. The recesses of the web may be coated with a release coating. A curable composition (e.g., a composition that may be cured to form a PSA) is coated into the recesses of the web over the release coating. A cover sheet, e.g. a film constructed of polyethylene terephthalate ("PET"), is coated over the curable composition and the web/composition/cover sheet assembly is exposed to UV irradiation to cure the composition into the PSA. The entire assembly is wound into a roll. When the assembly is unrolled, the PSA adheres to the film cover sheet and releases from the recesses of the web, thereby forming a film coated with a segmented PSA in the pattern provided by the recesses on the surface of the web. This process may be undesirable for manufacturing certain viscoelastic articles on a commercial scale because the web is not reusable, thereby creating waste, and the process cannot be practiced on a continuous basis. The process must be periodically interrupted to provide a fresh supply of the web material.

In another example, PSA-coated articles such as adhesive tapes and transfer coatings may be constructed by extruding a coating of PSA onto a molding tool. The surface of the PSA coating that is not in contact with the molding tool is contacted with a substrate, thereby transferring the PSA to the substrate. The PSA of the resulting article bears the surface structure provided by the molding tool. To ensure clean separation of the PSA layer from the structured surface of the molding tool, the adhesion of the PSA to the substrate must be greater than the adhesion of the PSA to the surface of the molding tool. This process is limited to manufacturing viscoelastic articles that can be constructed from extrudable viscoelastic materials. Also, this process does not provide a method of manufacturing a self-supporting viscoelastic article, i.e., a viscoelastic article that may exist independent of the substrate used to remove the adhesive layer from the molding tool.

A PSA transfer coating may be constructed that is independent of any backing layer by coating a PSA layer onto a release liner. The coated liner may then be rolled upon itself, thereby embossing the PSA layer with any structure that may be provided on one or both surfaces of the release liner. The transfer coating subsequently may be removed from the release liner, providing a transfer coating that is independent of any sort of backing layer. This process cannot be practiced on a continuous basis because the process must be periodically interrupted to provide a new supply of the release liner. Also, this process is limited to manufacturing viscoelastic articles that can be constructed from extrudable and embossible viscoelastic materials.

It may be desirable to manufacture viscoelastic articles from curable compositions on a continuous basis. It may further be desirable to manufacture viscoelastic articles on a continuous basis that are independent of a backing material. Present processes for manufacturing viscoelastic materials from curable compositions cannot be performed on a continuous basis and do not permit the continuous manufacturing of viscoelastic articles independent of a backing layer.

A need exists for a continuous method of manufacturing viscoelastic articles from curable compositions, including the continuous manufacturing of viscoelastic articles that are independent of a backing layer.

SUMMARY OF THE INVENTION

The method of the present invention permits the continuous manufacture of viscoelastic articles. The method of the present invention also permits the continuous manufacture of articles that are prepared from a cured composition and are self-supporting. The present invention provides a method of manufacturing a viscoelastic article in which a composition that is curable to a viscoelastic material is coated onto a first release surface of a production tool. This first release surface is reusable and configured to permit continuous production of viscoelastic articles. A substrate including a second release surface is contacted with the curable composition that has been coated onto the first release surface. The composition is at least partially cured, i.e., the composition may be partially or completely cured, typically while the composition is in contact with the first and second release surfaces. Once the composition has been cured to the desired extent, the viscoelastic article may be removed from one or both release surfaces, as desired. Thus, the methods of the present invention allow the manufacture of a viscoelastic article free from a backing.

Therefore, the present invention provides a method of making a viscoelastic article, the method including the steps of: providing a production tool having a reusable first release surface configured to permit substantially continuous use of the production tool, and a substrate having a second release surface; coating a composition curable to a viscoelastic material onto the first release surface, thereby defining an exposed surface of the curable composition; contacting the second release surface portion of the substrate with the exposed surface of the curable composition; at least partially curing the curable composition; removing the at least partially cured composition from the first release surface; and removing the at least partially cured composition from the second release surface.

The curable composition may be partially or completely cured prior to removing the cured composition from one of the release surfaces. If partially cured, the cured composition may or may not be completely cured before it is removed from the other release surface. Thus, the cured composition may be separated first from either the production tool or the substrate and, if desired, may be completely cured before being separated from the other. The viscoelastic article may include a pressure sensitive adhesive (PSA), a hydrogel, a hydrocolloid, an absorbent material, or any combination thereof. The first release surface, second release surface, or both release surfaces may include one or more structures such as pockets, ribs, channels or microchannels. The article may be formed as a continuous sheet or as individual articles such as oval discs.

Various other features and advantages of the present invention should become readily apparent with reference to the following detailed description, examples, claims and appended drawing. In several places throughout the specification, guidance is provided through lists of examples. In each instance, the recited list serves only as a representative group and should not be interpreted as an exclusive list.

DETAILED DESCRIPTION OF ILLUSTRATIVE EMBODIMENTS OF THE INVENTION

Figure 1:
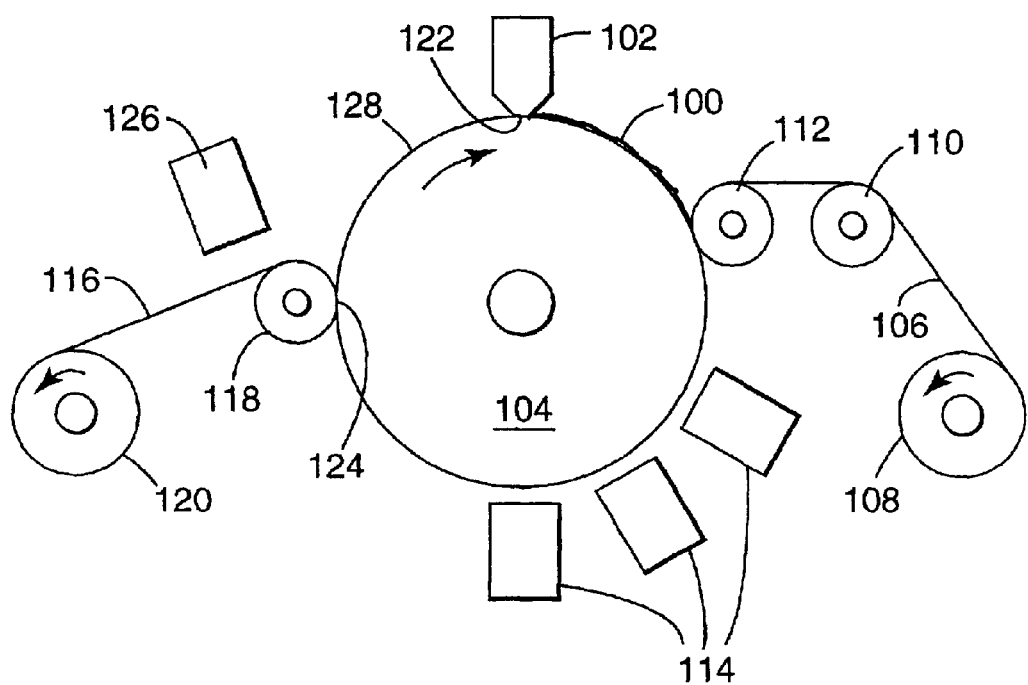
FIG. 1. is a schematic view of an apparatus for the manufacture of articles of the present invention.

For purposes of this invention, the following terms shall have the meanings set forth below.

"Cured composition" is meant, collectively, to refer to any composition that is cured to any extent, i.e., a cured composition may be partially cured or completely cured.

"Viscoelastic" shall refer to materials that exhibit both elastic and viscous properties. Elastic properties refer to the ability of a material to respond to an external stress by deforming, and upon removal of the stress, respond by returning to its original shape. Viscous properties refer to the ability of a material to respond to an external stress by deforming, and continuing to deform as long as the stress is present. A viscoelastic material may exhibit a transition from an immobile, glassy state to viscoelastic state at a temperature known as the glass transition temperature, Tg. A viscoelastic material also may be chemically or physically crosslinked to render it in the form of a viscoelastic solid. As used herein, viscoelastic materials include, but are not limited to, PSAs, hydrogels, hydrocolloids and hydrophilic gels.

"Viscoelastic article" is meant to include an article made from a viscoelastic material, including sheet material and individual articles, that has been cured to the desired extent for further use. A viscoelastic article, as used herein, may be either partially or fully cured.

The present invention provides a method of manufacturing a viscoelastic article in which a curable composition is coated onto production tool (e.g., a belt, a roller or a drum) having a reusable first release surface configured to permit substantially continuous use of the production tool. Prior to curing the composition, a substrate having a second release surface is contacted with the composition coated onto the first release surface. The composition may be partially or completely cured, for example, by photocuring. After the composition is partially or completely cured, both of the release surfaces may be removed from the cured composition, resulting in a viscoelastic article unattached to any sort of backing. Alternatively, if the composition is partially cured and additional curing is desired, the partially cured composition may be removed from one release surface while still contacting the other release surface. For example, the partially cured composition may be separated from the production tool while maintaining contact with the substrate. The curable composition may then be further cured while still in contact with the substrate. After the curable composition is cured to the desired extent, the resulting viscoelastic article may be removed from the substrate, thereby providing a viscoelastic article unattached to any backing. Therefore, the present invention provides a method that permits substantially continuous manufacture of one or more viscoelastic articles by a process that includes coating a curable composition onto a reusable surface, curing the composition sufficiently to form the viscoelastic article, then removing the viscoelastic article from the reusable surface.

The methods of the present invention therefore permit continuous manufacture of a viscoelastic article with less waste and reduced cost compared to methods of manufacturing a viscoelastic article by coating and curing between two consumable substrates, e.g., release liners. The methods of the present invention also provide a method by which a self-supporting viscoelastic article may be manufactured, i.e., the viscoelastic article may be capable of maintaining its strength and integrity without the aid of a substrate, e.g., a supportive backing.

A manufacturing line for practicing the method of the present invention is shown schematically in FIG. 1. The curable composition 100 may be coated onto a production tool 104 including a first release surface (not shown). In one embodiment, the curable composition 100 is coated through a feeder 102 by gravity or under pressure. However, other methods of coating the curable composition 100 onto the first release surface may be suitable. Alternative methods of coating the curable composition onto the first release surface include, but are not limited to, die coating and knife coating.

The production tool 104 may be any type of tool capable of providing a reusable surface that may be configured to permit substantially continuous production of the viscoelastic article 116. Suitable configurations for the production tool 104 include, but are not limited to, a belt, a drum, or a roller. Such configurations may permit substantially continuous production of the viscoelastic article 116 because the curable composition 100 may be coated onto the first release surface of the production tool 104 at a coating location 122 and the cured viscoelastic article 116 may be removed at a peel location 124, thereby regenerating unoccupied surface area 128 on the production tool first release surface that is available for re-coating with curable composition 100. The production tool 104 should be capable of rotation in order to allow continuous manufacture of viscoelastic articles 116 according to the methods of the present invention. Rotation of the production tool 104 may be motorized, manual, or passive, e.g., the result of forces applied elsewhere in the manufacturing line that may pull or drive rotation of the production tool 104.

A substrate 106 including a second release surface may be stored in a roll 108 and guided over an idler roll 110. A precisely positioned nip roll 112 may be mounted such that it contacts the production tool 104, as shown in FIG. 1. The substrate may be wrapped around the nip roll 112 to form a nip between the first release surface on the production tool 104 and the second release surface on the substrate 106. Edge dams may be used to control spreading of the curable composition 100 across the width of the substrate. The second release surface should have a low surface energy so that the viscoelastic article 116 can eventually be removed from the substrate 106. The curable composition may be distributed between the first release surface (on the production tool 104) and the second release surface (on the substrate 106), thereby contacting both release surfaces. The first release surface, second release surface, or both release surfaces may include surface structures intended to impart surface structure to the viscoelastic article 116. A release surface can be designed having a structured surface that is complementary to, i.e, a negative image of, the structure desired on the surface of the viscoelastic article 116.

The curable composition 100 thus coated between the first and second release surfaces may be cured using an energy source 114. The curable composition 100 may be cured to any desired degree, generally from about 30% to 100%. The curable composition 100 should be cured sufficiently so that it can be removed cleanly from at least one release surface. If the curable composition 100 is insufficiently cured, it may be too tacky to be removed from a release surface without losing its integrity. If either release surface includes surface structures, the curable composition 100 should be cured sufficiently to preserve the surface structures imparted to the partially or completely cured composition. In certain embodiments, the curable composition 100 may be cured from about 50% to 100%, in particular from about 60% to about 70%. However, the extent of curing desired for a particular application of the methods of the present invention will depend, in part, upon the ability of the partially cured composition to maintain its integrity.

The curable composition 100 may be cured by the energy source 114 using any suitable curing means including, but not limited to, heat, infrared, ultraviolet, visible or electron beam radiation. Infrared radiation, as used herein, refers to non-particulate radiation having a wavelength within the range of about 800 nanometers to about 3 millimeters. Ultraviolet radiation, as used herein, refers to non-particulate radiation having a wavelength within the range of about 200 to about 400 nanometers. Visible radiation, as used herein, refers to non-particulate radiation having a wavelength within the range of about 400 to about 800 nanometers. Electron beam radiation has a dosage within the range of about 0.1 to about 10 Mrad.

The rate of curing at a given level of radiation may vary according to the transmissive properties of the substrate 106 as well as the density, temperature, and nature of the curable composition 100. It may be possible to control curing so that the surface of the curable composition 100 that is in contact with the substrate 106 is cured to a greater extent than the curable composition that is in contact with the production tool 104. Such control of curing may provide the cured composition with release characteristics desirable for a particular application because, generally, a partially cured composition may be more easily removed from a release surface than a completely cured composition.

The partially or completely cured composition may be removed from the first release surface, the second release surface, or both release surfaces. In one embodiment, the partially cured composition may be removed from the first release surface (i.e., the production tool 104) at the peel location 124 by a peel roll 118 while still in contact with the second release surface (i.e., the substrate 106). Once the viscoelastic article 116 is cured to the desired extent, the viscoelastic article 116 may be removed from the second release surface, thereby providing a self-supporting viscoelastic article that is independent of any supporting structure such as a backing or liner. The partially cured composition may or may not be further cured by an optional second energy source 126. Suitable methods of curing by the second energy source 126 are the same as those described above for energy source 114. FIG. 1 shows the viscoelastic article 116 being collected on a roll 120 prior to removal from the substrate 106. The substrate 106 subsequently may be separated from the viscoelastic article 116 by any suitable means known in the art of adhesive transfer. Whether the partially cured composition is subjected to curing by the second energy source 126 may depend, in part, upon the strength and viscosity desired in the viscoelastic article 116 compared to the strength and viscosity of the partially cured composition.

In an alternative embodiment (not shown), the partially or completely cured composition may be removed from the second release surface (substrate) while still in contact with the first release surface (production tool). In such an embodiment, the curable composition may be partially or completely cured by an energy source as described above. The substrate may be removed, for example, by a roller or simply because the second release surface has a very low surface energy. If the composition is partially cured, it may be further cured by a second energy source, if desired, while still in contact with the production tool. The viscoelastic article may be removed from the production tool by any suitable means that will maintain the integrity of the viscoelastic article.

The curable composition may include any suitable composition that can be cured to form a viscoelastic material. Properties of viscoelastic materials are described in John D. Ferry, Viscoelastic Properties of Polymers (John Wiley & Sons, Inc., 1980). Suitable curable compositions include those that may be cured to form viscoelastic materials that are self-supporting (i.e., generally maintain their shape at room temperature) and are not significantly flowable or extrudable at room temperature. Such viscoelastic materials will generally have a Tg less than about 23° C. Certain curable compositions may form viscoelastic materials having a Tg from about −100° C. to about 0° C., with those forming viscoelastic materials having a Tg from about −50° C. to about −30° C. having been identified as having particular utility.

The resulting viscoelastic materials may include PSAs, hydrogels, hydrocolloids, hydrophilic gels (as described in International Publication No. WO 01/60296, published Aug. 23, 2001), and combinations thereof. Particularly useful viscoelastic materials include hydrogels made from polymers and copolymers of acrylates, methacrylates, acrylamides, methacrylamides, hydroxy alkyl acrylates, hydroxy alkyl methacrylates, N-vinylpyrrolidinone, and vinyl ethers. Additional hydrogels useful for practicing the methods of the present invention are described in U.S. Ser. No. 10/121,518, filed Apr. 12, 2002 by the assignee of the present invention.

The first release surface may be configured in any manner that permits reusing the surface in a continuous manufacturing process. For example, the first release surface may be the surface of a tool such as, but not limited to, a belt, roller or drum. The tool may be constructed from a release material in order to provide the first release surface, the release material being selected to provide sufficient release characteristics such that it can promote the release of the cured composition from the tool. Suitable release materials include, but are not limited to, silicone and fluorocarbon polymers. Alternatively, the tool may be constructed of any suitably supportive material and then coated with a release coating in order to provide the first release surface. Suitable release coatings include, but are not limited to, silicone and fluorocarbon polymers.

The substrate is contacted with the curable composition prior to curing. Because viscoelastic articles made using the method of the present invention can be self-supporting, the substrate may be removed from the viscoelastic article prior to use of the viscoelastic article. After being contacted with the curable composition and until being removed from the viscoelastic article, the substrate may provide support for the curable composition, for the partially cured composition, or for the completely cured composition. In addition, the substrate may be flexible so that the substrate can traverse along a manufacturing line, e.g., while the curable composition is in contact with the first release surface or a post-cure production line such as for processing or storage of the viscoelastic articles. The substrate may be constructed from any suitable material capable of providing support, flexible support if desired, to the cured composition. In addition, the substrate may be constructed from a UV-transparent material. For certain embodiments, the substrate may have low oxygen permeability in order to limit diffusion of oxygen through the substrate. Oxygen that diffuses through the membrane may quench curing of the curable composition if the curing method includes radical polymerization.

The substrate includes the second release surface and may be constructed from a release material such as, but not limited to, silicone polymers, fluorocarbon polymers or films of polyesters, e.g., polyethylene terephthalate ("PET"). Alternatively the substrate may be constructed from any suitably supportive material and further include a release coating in order to provide the second release surface. Such coated substrates may include, without limitation, films such as polyester, polyethylene or polypropylene films that have a silicone or fluorocarbon polymer release coating. The release material or release coating useful for providing the second release surface may be the same or different than the release material or release coating used to provide the first release surface.

The release material or release coating provides the production tool and the substrate with low surface energy surfaces: the first release surface and the second release surface, respectively. In one embodiment of the present invention, the first release surface has a surface energy that is lower than the surface energy of the second release surface. The cured composition will, therefore, preferentially adhere to the substrate when the substrate is separated from the first release surface. Two factors contribute to the preferential release of the cured composition from the first release surface: the adhesion force of the cured composition to the first release surface and the adhesion force of the cured composition to the second release surface. Preferential adhesion of the cured composition to the substrate rather than the first release surface may be dependent, in part, on the material used to construct the first release surface, the materials selected to construct the second release surface, and the degree to which the composition is cured before the substrate and the cured composition are separated from the first release surface. Generally, a partially cured composition can be more easily removed from the first release surface than a completely cured composition. For example, a partially cured composition may be easily removed from the first release surface and still remain adhered to a substrate having a low surface energy second release surface. A completely cured composition may be more difficult to remove from the first release surface and, if complete curing is desired, may require that the second release surface material have a relatively high surface energy, e.g., by using a PET substrate.

In the embodiment of the present invention shown schematically in FIG. 1, the cured composition adheres to the second release surface, i.e., the substrate 106, when the substrate 106 is separated from the production tool 104. Consequently, the first release surface, i.e., the production tool 104, becomes available for re-coating with more curable composition 100 in the continuous manufacturing process of the present invention. Also in this embodiment of the present invention, partially cured composition optionally may be transported while still adhered to the substrate 106 to an appropriate location for further curing by a second energy source 126.

Another feature of the method shown schematically in FIG. 1 is that the surface energy of the substrate may be sufficiently low to allow the substrate 106 to be removed from the viscoelastic article 116 while maintaining the strength and the integrity of the article 116. Previous methods of curing materials to make viscoelastic articles may require that the cured material remain adhered to a substrate such as a backing or require that the material be cured between two substrates, e.g., release liners, that are discarded after removal from the finished article. Thus, the method of the present invention is able to provide a self-supporting viscoelastic article by at least partially curing a composition between a reusable surface (the first release surface of production tool) and the release surface of a substrate (the second release surface) and subsequently removing the article from both the reusable surface and the substrate. This is made possible by the selection of materials used to construct the first release surface and the second release surface, such that a) the cured composition will preferentially adhere to the second release surface when the substrate is removed from the production tool, and b) the viscoelastic article can be removed from the second release surface without damaging the article.

The reusable first release surface may be smooth or may include a structured surface such as a micro- or macro-replicated pattern. The reusable surface may include any suitable structured surface, patterned or unpatterned. Suitable structured surfaces include, but are not limited to, wells, pockets, ridges, channels and the like. Any structure of the reusable surface will be the negative image of the structured surface desired on the viscoelastic article. For example, ridges on the reusable surface will manifest as channels in a surface of the viscoelastic article. Macrostructures in the reusable surface may also provide for reducing waste in the manufacturing of the viscoelastic articles. For example, a reusable surface may include an array of pockets with land areas between the pockets. Such pockets may be of any desired shape, such as, but not limited to, oval, circular, square, rectangular, or triangular. In the process of the present invention, a majority of the curable composition may collect in the pockets with little or no curable composition in the land areas, thereby permitting the manufacture of individual viscoelastic articles, i.e., as discs complementary to the shape of the pockets, with minimal cured composition between the pockets. In some applications, it may be desired to have some of the cured composition remain between the pockets in order to provide a sheet of cured material connecting the individual viscoelastic articles, thereby simplifying handling of the viscoelastic articles. In other applications, it may be preferred to substantially eliminate cured material from between the articles.

Additionally, a primary structured surface (or primary structure) on the reusable surface may include a secondary structured surface (or secondary structure), i.e., a structured surface within a structured surface. For example, a primary structure on the reusable surface, such as a pocket, may include one or more additional structures, such as channels, within the primary structure. The secondary structures may be micro- or macro-scaled. In one embodiment of the present invention, a reusable surface includes oval-shaped pockets as primary structures having channels as secondary structures on the bottom surface of the pockets. The resulting individual viscoelastic article is an oval disc including at least one surface having ridges.

In one embodiment, primary structures on the reusable surface include intermittent recessed channels about 0.51 mm deep and 2.5 cm long, spaced about 0.5 cm end-to-end, and arranged in 178 rows around the circumference of the reusable surface. Each row includes 170 channels, each channel being about 0.1 cm wide, spaced about 0.3 cm apart side-to-side across the width of the reusable surface. Each row of channels is offset by about 1.25 cm.

In an alternative embodiment, the reusable surface includes continuous channels (not intermittent) of dimensions and lateral spacing as described above. In yet another embodiment, the reusable surface includes individual oval-shaped pockets having intermittent channels on the bottom surface of the pockets. The pockets are about 10.8 cm by about 9.2 cm, with the minor axis of the pockets being generally aligned with the longitudinal axis of the web. The oval pockets may be about 0.76 mm deep and the channels may be about 0.51 mm deep, providing the viscoelastic article with a total thickness of about 1.27 mm. In one embodiment, the reusable surface includes an array of oval pockets having four oval pockets across the reusable surface and 56 oval pockets around the circumference of the reusable surface, providing a total of 224 oval pockets on the reusable surface. The pockets may or may not include a pattern of intermittent channels, as described above, within the pockets, thereby providing a corresponding pattern of ribs on the surface of the viscoelastic article. If present, the channels may be micro- or macro-scale and may be oriented on the reusable surface in any manner suitable for a particular application. For example, the channels may be oriented substantially parallel to the minor axis of the oval pockets.

In one embodiment, the methods of the present invention may be used to construct an absorbent viscoelastic article having a Saline Absorbency of at least about 100%. Saline Absorbency may be measured by weighing a sample of the viscoelastic material to determine its dry weight, $W_o$. The viscoelastic article may be placed in contact with an excess volume of 0.9% isotonic saline solution for 24 hours. The article may then be removed from the saline solution, blotted dry, then weighed to obtain the wet weight, $W_{24}$. The percent absorbency values may be calculated using the following formula:

$$\text{Saline Absorbency (\%)} = \frac{(W_{24} - W_0)}{W_0} \times 100.$$

The methods of the present invention may be useful for the manufacture of viscoelastic articles having a structured surface and one or more particularly desired properties. For example, the viscoelastic article may be a pressure sensitive adhesive ("PSA"), a hydrogel, a fluid (e.g., water or wound exudate) absorbing polymer, or a combination thereof. For examples, a structured PSA may provide a) fluid control capabilities to an article conformable to rough or irregular surfaces, or b) advantageous adhesion to layers of the article or to skin. In another example, the methods of the present invention may be used to make an absorbent viscoelastic article in the shape of an oval disk for use in a wound dressing. The absorbent viscoelastic article may include structured channels to facilitate fluid distribution throughout the entire article mass and the article may also optionally have adhesive properties, e.g., PSA properties.

EXAMPLES

The following examples have been selected merely to further illustrate features, advantages, and other details of the invention. It is to be expressly understood, however, that while the examples serve this purpose, the particular materials and amounts used as well as other conditions and details are not to be construed in a matter that would unduly limit the scope of this invention.

Belt Preparation

A flexible silicone belt was prepared using techniques commonly used in the printing industry. A flexo-graphic printing plate having an image the same as the pattern desired on the viscoelastic article was used as a mold to make the silicone belt. Silastic M silicone (Dow Chemical Co., Midland, Mich.) was applied over the flexo-graphic plate and cured. A nylon mesh scrim was laid over the cured Silastic M silicone and a coating of Silastic J silicone (Dow Chemical Co., Midland, Mich.) was added and cured to add strength to the belt. The belt was spliced together using an RTV silicone.

Coat and Cure Apparatus I

A belt including a pattern of pocket structures on its surface was prepared as described above and used in the construction of a drum similar to that depicted in FIG. 1. A precisely positioned idler roll was mounted on the top portion of the drum. The idler was positioned such that it contacted the edge of the belt. A substrate, i.e., a polyethylene terephthalate ("PET") liner coated on both sides with a silicone release coating, was wrapped around the idler and laid on top of the drum forming a nip between the belt and the substrate. One side of the substrate formed a release surface that was configured to contact the uncured composition once the composition was coated onto the belt. The belt was driven and the drum freely turned using a pull roll.

Coat and Cure Apparatus II

An alternative polymerization apparatus included a patterned, reusable silicone belt about 274 cm in circumference. The belt was mounted on two free rolling idler rolls having diameters of about 15.2 cm and spaced about 110.5 cm apart. The belt was about 20.3 cm wide and had a pattern of continuous channels on its surface. A nip roll was precisely positioned above one of the idler rolls. A silicone-coated PET substrate was wrapped around the nip roll, thereby forming a nip between the belt and a silicone-coated substrate. A bank of Sylvania F20T12 350 BL fluorescent bulbs, about 122 cm long and about 6.4 cm on centers, was placed above the silicone belt such that the bulbs were about 7.6 cm above the belt. A peel roll was placed above the other idler roll. The substrate was wrapped 180 degrees around the peel roll and into a nitrogen inerted chamber about 9.1 m long containing bank of Sylvania F40T12 350BL fluorescent bulbs. The substrate was pulled by a pull roll at the end of the second bank of lights.

Example 1

A 90/10 mixture of isooctylacrylate/acrylic acid containing 0.1% Irgacure 651 (Ciba Specialty Chemicals Corp., Tarrytown, N.Y.) was degassed with a stream of nitrogen, then partially cured to a viscosity of 4500 cps. using a Sylvania F20T8 350 BLB fluorescent bulb. 2,6-Bistrichloromethyl-4-(3,5-dimethoxy-phenyl)-1,3,5-s-trizine, (U.S. Pat. No. 4,391,687) was added to the isooctylacrylate/acrylic acid composition to a final concentration of 0.15%, then thoroughly mixed to form a curable composition having a Tg of –30° C. The curable composition was coated onto the reusable silicone belt of the Coat and Cure Apparatus II described above. The silicone belt included a continuous channel pattern as described above. A differential silicone substrate, Loparex 6250/6200 silicone liner (Loparex Inc., Willowbrook, Ill.), was laid on top of the curable composition coated on the belt using a nip roll with a gap of about 0.025 mm. The 6250 side of the substrate was contacted with the curable composition. The curable composition was partially cured with a bank of Sylvania F20T12 350BL fluorescent bulbs delivering 141 mJ/cm² at an average intensity of 2.7 mW/cm² (UVMAP, UV integrating Radiometer, EIT, Sterling, Va.). The partially cured composition and substrate was separated from the belt. The partially cured composition was further cured by being passed through a nitrogen inerted chamber containing an additional bank of Sylvania F20T12 350BL fluorescent bulbs.

The resulting viscoelastic article was a patterned pressure sensitive adhesive ("PSA") containing ribs about 0.51 mm high with spacing of about 1 cm between ribs. The total thickness of the PSA was about 0.56 mm.

A portion of the curable composition was coated in an area of the belt having no surface structure. This area of the belt produced a smooth PSA, about 0.025 mm thick, with good performance properties.

Example 2

A curable composition containing 20 parts by weight of N-vinylacetamide (Showa Denko, Tokyo, Japan), 73.76 parts M-PEG 400 acrylate (Osaka Organic Chemical Co., Osaka, Japan), 6 parts by weight of lauryl acrylate (Osaka Organic Chemical Co., Osaka, Japan), 0.1 parts by weight of alpha methylstryene (Aldrich Chemical Co., Milwaukee, Wis.) and 0.14 parts by weight of Darocure 2959 (Ciba Specialty Chemicals Corp., Tarrytown, N.Y.) was degassed with a stream of nitrogen and partially cured to a viscosity of 2250 cps using a Sylvania F20T12 350BL fluorescent bulb. The resulting curable composition was coated onto a patterned, reusable silicone belt using Coat and Cure Apparatus II. The silicone belt included a continuous channel pattern as described above. A differential silicone substrate, Loparex 6250/6200 (Loparex Inc., Willowbrook, Ill.) was laid on top of the curable composition coated on the belt using a nip roll with a gap of about 0.76 mm. The 6250 side of the substrate was contacted with the curable composition. The composition was cured to about 75% with a bank of Sylvania F20T12 350BL fluorescent bulbs delivering 141 mJ/cm² at an average intensity of 2.7 mW/cm². The partially cured composition and the substrate were separated from the belt. The partially cured composition was completely cured by being passed through a nitrogen inerted chamber containing a bank of Sylvania F20T12 350BL fluorescent bulbs.

The resulting viscoelastic article was a replicated, tacky, fluid-adsorbing polymer containing ribs about 0.51 mm high with spacing of about 1 cm between ribs. The total thickness of the polymer was about 1.02 mm.

Example 3

A curable composition containing 28.74 parts by weight of a premix (described below), 59.8 parts methoxypolyethylene glycol 400 acrylate (Osaka Organic Chemical Co., Osaka, Japan), 11.26 parts by weight of 2-hydroxyethyl methacrylate (Mistubishi Rayon Co. Tokyo, Japan), 0.16 parts by weight of Darocure 2959 (Ciba Specialty Chemicals Corp., Tarrytown, N.Y.) was degassed with a stream of nitrogen and partially cured using a medium pressure bulb to a viscosity of about 2200 cps. The premix was prepared from 17.4 parts Gantrez S 95 resin (International Specialty Products, Wayne, N.J.) and 82.6 parts by weight of 2-hydroxyethyl methacrylate (Mistubishi Rayon Co. Tokyo, Japan). 0.04 parts, by weight, of Irgacure 819 (Ciba Specialty Chemicals Corp., Tarrytown, N.Y.) was added to the partially cured material and then mixed to form a curable composition having a Tg of −47.9° C. for coating onto the reusable silicone belt. The belt included an intermittent channel pattern as described above. Edge dams were used to control spreading of the curable composition across the width of the belt to about 18 cm. A Loparex silicone substrate 6200/4320C (Loparex Inc., Willowbrook, Ill.) was laid onto the curable composition coated onto the belt. The 6200 side was in contact with the curable composition. The composition was cured to about 70% using Coat and Cure Apparatus I for exposure to 336 mJ/cm² of UV irradiation at an average intensity of 3.7 mW/cm². The belt speed was about 3.7 m/min.

The partially cured viscoelastic article and substrate were removed from the belt by separating the substrate from the belt. A thin film of uncured material remained on the belt after the partially cured material was removed.

Example 4

A curable composition containing 15 parts by weight of poly(ethylene glycol-ran-propylene glycol) dimethacrylate (reaction product of UCCN 75-H-90,000 (Union Carbide, Charleston, W.Va.) with methacrylic anhydride), 20 parts by weight of 2-hydroxyethyl methacrylate (Mistubishi Rayon Co. Tokyo, Japan), 65 parts by weight of methoxypolyethylene glycol 400 acrylate (Osaka Organic Chemical Co., Osaka, Japan), 0.1 parts by weight of alpha methylstryene (Aldrich Chemical Co., Milwaukee, Wis.), 0.16 parts by weight of Darocure 2959 (Ciba Specialty Chemicals Corp., Tarrytown, N.Y.) was degassed with a stream of nitrogen and partially cured to a viscosity of about 1000 cps. 0.04 parts by weight of Irgacure 819 (Ciba Specialty Chemicals Corp., Tarrytown, N.Y.) was added and mixed to form a curable composition having a Tg of −50.2° C. The resulting curable composition was coated onto a reusable, silicone-coated belt containing oval pocket surface structures described above. Edge dams were used to control spreading of the curable composition across the width of the belt to about 18 cm. A Loparex silicone substrate 6200/4320C (Loparex Inc., Willowbrook, Ill.) was laid on top of the curable composition coated onto the belt. The 6200 side was in contact with the curable material. The composition was partially cured to about 75% using Coat and Cure Apparatus I for exposure to 336 mJ/cm² UV irradiation at an average intensity of 3.7 mW/cm². The belt speed was about 3.7 m/min.

The partially cured viscoelastic article and substrate were removed from the belt by separating the substrate from the belt. A thin film of uncured material remained on the belt after the partially cured material was removed.

Example 5

A curable composition containing 15.4 parts by weight of poly(ethylene glycol-ran-propylene glycol) dimethacrylate (reaction product of UCCN 75-H-90,000 (Union Carbide, Charleston, W.Va.) with methacrylic anhydride) 16.6 parts by weight of 2-hydroxyethyl methacrylate (Mistubishi Rayon Co. Tokyo, Japan), 67.7 parts by weight of methoxypolyethylene glycol 400 acrylate (Osaka Organic Chemical Co., Osaka, Japan), 0.1 parts by weight of alpha methylstryene (Aldrich Chemical Co., Milwaukee, Wis.), 0.14 parts by weight of Darocure 2959 (Ciba Specialty Chemicals Corp., Tarrytown, N.Y.) was degassed with a stream of nitrogen for 15 minutes and partially cured with vigorous stirring using a medium pressure mercury bulb to a viscosity of about 1000 cps. 0.04 parts by weight of Irgacure 819 (Ciba Specialty Chemicals Corp., Tarrytown, N.Y.) were added and mixed. The resulting curable composition was coated onto a reusable silicone belt about 51 cm wide. The belt contained a pattern of intermittent channels as described above, except the channels were grouped in three lanes. One lane was about 11.4 cm wide, the second lane was about 19.0 cm wide and the third was about 15.2 cm wide. The lanes were spaced about 0.6 cm apart. Each lane contained a plurality of channels that were about 2.5 cm long and about 0.1 cm wide. The channels within a lane were spaced about 0.5 cm apart laterally and about 0.3 cm apart longitudinally.

The curable composition was partially cured using Coat and Cure Apparatus I for exposure to 289 mJ/cm$^2$ UV irradiation at an average intensity of 1.6 mW/cm$^2$. A Loparex silicone substrate 8500/8500 (Loparex Inc., Willowbrook, Ill.) was laid on top of the curable composition that was coated onto the belt. The belt speed was about 1.8 m/min.

The partially cured composition and substrate were removed from the belt by separating the substrate from the belt. A thin film of uncured material remained on the belt after the partially cured material was removed. The partially cured composition was further cured using a bank of Sylvania F40T12 350 BL fluorescent bulbs delivering 3842 mJ/cm$^2$ at an average intensity of 6.6 mW/cm$^2$. This process yielded a fluid adsorbing, patterned viscoelastic article about 1.02 mm thick, useful for subsequent construction of medical dressings.

The complete disclosures of the patents, patent documents and publications cited herein are incorporated by reference in their entirety as if each were individually incorporated. In case of conflict, the present specification, including definitions, shall control.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method of making one or more viscoelastic articles comprising:
    providing a production tool having a reusable first release surface configured to permit substantially continuous use of the production tool, and a substrate having a second release surface;
    coating a composition curable to an absorbent viscoelastic material onto the first release surface, thereby defining an exposed surface of the curable composition;
    contacting the second release surface portion of the substrate with the exposed surface of the curable composition;
    at least partially curing the curable composition;
    removing the at least partially cured composition from the first release surface; and
    removing the at least partially cured composition from the second release surface;
    wherein at least one of the first release surface and the second release surface comprises a structured surface.

2. The method of claim 1 further comprising:
    further curing the at least partially cured composition after removing the composition from the first release surface, but prior to removing the composition from the second release surface.

3. The method of claim 1 further comprising:
    further curing the at least partially cured composition after removing the composition from the second release surface, but prior to removing the composition from the first release surface.

4. The method of claim 1 wherein the first release surface comprises a first release coating.

5. The method of claim 4 wherein the first release coating comprises a silicone polymer or a fluorocarbon polymer.

6. The method of claim 1 wherein the second release surface comprises a second release coating.

7. The method of claim 6 wherein the second release coating comprises a silicone polymer or a fluorocarbon polymer.

8. The method of claim 1 wherein curing the curable composition comprises photocuring.

9. The method of claim 1 wherein the absorbent viscoelastic material comprises a hydrogel.

10. The method of claim 9 wherein the hydrogel comprises at least one polymer or copolymer made from an acrylate, a methacrylate, an acrylamide, a methacrylamide, a hydroxy alkyl acrylate, a hydroxy alkyl methacrylate, N-vinylpyrrolidinone, a vinyl ether, or any combination thereof.

11. The method of claim 1 wherein the absorbent material has a Saline Absorbency of at least about 100%.

12. The method of claim 1 wherein the structured surface comprises a plurality of channels.

13. The method of claim 12 wherein the channels are microchannels.

14. The method of claim 1 wherein the structured surface comprises at least one primary structure.

15. The method of claim 14 wherein at least one primary structure comprises a secondary structured surface.

16. The method of claim 15 wherein the secondary structured surface comprises a plurality of channels.

17. The method of claim 16 wherein at least one channel is a microchannel.

18. The method of claim 14 wherein the primary structure comprises a pocket capable of collecting the curable composition.

19. The method of claim 18 wherein the pocket further comprises a secondary structured surface.

20. The method of claim 19 wherein the secondary structured surface comprises a plurality of channels.

21. The method of claim 1 wherein a plurality of individual articles are made.

22. The method of claim 21 wherein the individual articles comprise oval discs.

23. A method of making one or more hydrogel articles comprising:
    providing a production tool having a reusable first release surface configured to permit substantially continuous use of the production tool, and a substrate having a second release surface;
    coating a composition curable to a hydrogel onto the first release surface, thereby defining an exposed surface of the curable composition;
    contacting the second release surface portion of the substrate with the exposed surface of the curable composition;
    at least partially curing the curable composition;
    removing the at least partially cured composition from the first release surface; and
    removing the at least partially cured composition from the second release surface.

24. The method of claim 23 further comprising:
    further curing the at least partially cured composition after removing the composition from the first release surface, but prior to removing the composition from the second release surface.

25. The method of claim 23 further comprising:
further curing the at least partially cured composition after removing the composition from the second release surface, but prior to removing the composition from the first release surface.

26. The method of claim 23 wherein curing the curable composition comprises photocuring.

27. The method of claim 23 wherein the hydrogel comprises at least one polymer or copolymer made from an acrylate, a methacrylate, an acrylamide, a methacrylamide, a hydroxy alkyl acrylate, a hydroxy alkyl methacrylate, N-vinylpyrrolidinone, a vinyl ether, or any combination thereof.

28. The method of claim 27 wherein the hydrogel has a Saline Absorbency of at least about 100%.

29. The method of claim 23 wherein at least one of the first release surface and the second release surface comprises a structured surface.

30. The method of claim 29 wherein the structured surface comprises a plurality of channels.

31. The method of claim 30 wherein the channels are microchannels.

32. The method of claim 29 wherein the structured surface comprises at least one primary structure.

33. The method of claim 32 wherein at least one primary structure comprises a secondary structured surface.

34. The method of claim 33 wherein the secondary structured surface comprises a plurality of channels.

35. The method of claim 34 wherein at least one channel is a microchannel.

36. The method of claim 32 wherein the primary structure comprises a pocket capable of collecting the curable composition.

37. The method of claim 36 wherein the pocket further comprises a secondary structured surface.

38. The method of claim 37 wherein the secondary structured surface comprises a plurality of channels.

39. The method of claim 23 wherein a plurality of individual articles are made.

40. The method of claim 39 wherein the individual articles comprise oval discs.

* * * * *